June 23, 1970  R. L. COOK  3,516,898
HARD FACED PLASTIC ARMOR
Filed June 23, 1966
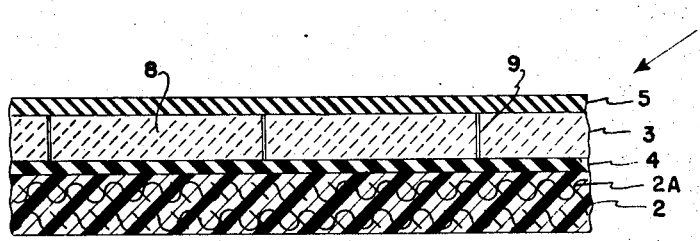
FIG.-1
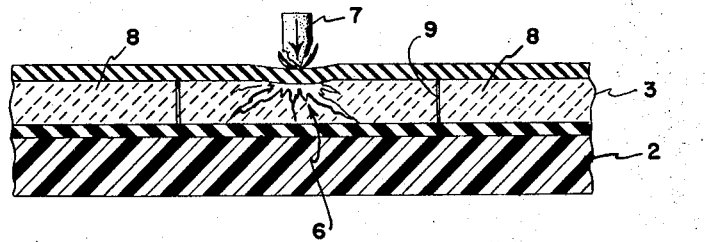
FIG.-2
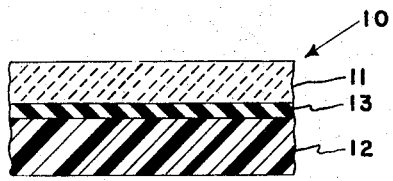   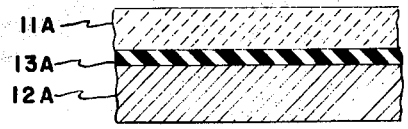
FIG.-3A   FIG.-3B
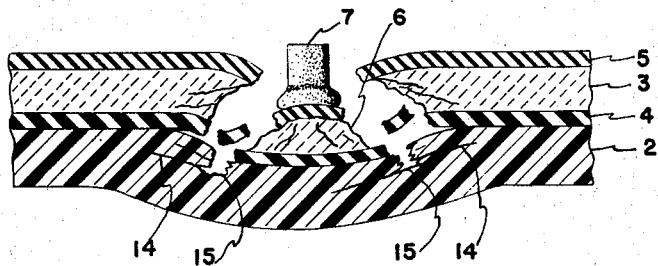
FIG.-4
INVENTOR
RICHARD L. COOK
BY:
ATTORNEY

United States Patent Office 3,516,898
Patented June 23, 1970

---

3,516,898
HARD FACED PLASTIC ARMOR
Richard L. Cook, Phoenix, Ariz., assignor to Goodyear Aerospace Corporation, Akron, Ohio, a corporation of Delaware
Continuation-in-part of application Ser. No. 268,765, Mar. 28, 1963. This application June 23, 1966, Ser. No. 560,927
Int. Cl. B32b *1/12, 17/10*
U.S. Cl. 161—93                  5 Claims

ABSTRACT OF THE DISCLOSURE

A hard faced plastic armor plate laminate is provided which can be either clear or opaque. The facing layer is laminated to a base by a flexible adhesive. The facing layer is a very hard material taken from a group including alumina ceramic, boron carbide ceramic, and silicon carbide ceramic. The base is preferably a resin impregnated glass fabric that tends to delaminate with a force absorbing action over a wide area upon impact.

---

This invention relates to hard faced plastic armor plate laminate, and, more particularly, to a laminate structure which can be either clear or opaque, which is highly resistant to armor piercing type of bullets, and it is a continuation-in-part and an improvement over patent application No. 268,765, field Mar. 28, 1963, and also assigned to Goodyear Aerospace Corporation, Akron, Ohio.

Heretofore it has been known that there are many and varied ways to create armored plate. However, this armored plate has usually been metal, which has been heavy and expensive. There has been attempts to create transparent bullet resisting armored plates, but these plates have also had to be extremely thick and heavy as well as expensive, and have not proved practical or durable for use in military warfare, or more particularly for use in aircraft where lightness of weight is an essential criteria.

It is the general object of the invention to avoid and overcome the foregoing and other difficulties of and objections to prior art practices by the provisions of a hard faced plastic armor plate laminate structure which is highly effective to bullet resistance, extremely light in weight and easy to handle, and which is also relatively low in cost.

Another object of the invention is the provision of an armor plate made of ceramic and plastic wherein the ceramic is positioned to shatter or, by fusion and melting to dissipate the bullet and to then carry the load of impact into a resilient backing, thereby distributing the force of the bullet over a large diameter on the final load carrying plastic layer.

Another object of the invention is to provide a lightweight, effective shaped charge resistant plastic laminate utilizing the principle of a brittle outer layer which, by breaking up in a conical pattern tends to dissipate the jet blast of a shaped charge in combination with the low thermal conductivity and high heat of ablation properties of a plastic backing layer.

Another object of the invention is to provide a plastic laminate armor plate utilizing a very hard aluminum oxide as an outer layer with the layer segmented into tiles so that the concentrated energy of a projectile can be locally absorbed without fracture and loss of the surrounding facings, the substrata layer being bonded to the aluminum oxide layer by a flexible bonding agent capable of retaining the tile under severe impact deformation.

Another object of the invention is to provide a laminate of the type set forth in which the substrata yields and delaminates to absorb force during bullet penetration.

The aforesaid objects of the invention, and other objects which will become apparent as the description proceeds, are achieved by providing a laminate structure resistant to either a solid steel core projectile or a shaped charge projectile and including the combination of a facing layer made from an extremely hard material, a reinforced plastic substrata layer, flexible bonding means between the facing layer and the substrata layer, the facing layer being segmented into sections so that the concentrated energy of the projectile can be locally absorbed without fracture and loss of the surrounding facing, the facing layer having the tendency to shatter in an expanding conical shape inwardly from the impact point of the bullet, the substrata layer having low thermal conductivity and high heat ablation properties, and the substrata having high resilience and high impact resistance.

For a better understanding of the invention reference should be had to the accompanying drawings, wherein:

FIG. 1 is a fragmentary cross sectional view of a laminate structure comprising one embodiment of the invention;

FIG. 2 is a fragmentary cross sectional view of the laminate structure of FIG. 1 showing a projectile just after striking the outer layer of the laminate and the fragmentation that results therefrom;

FIG. 3A is a fragmentary cross sectional view of a transparent form of the plastic laminate armor plate comprising the invention;

FIG. 3B is a fragmentary cross sectional view of a laminate structure with a hard outer layer and a metallic backing layer; and FIG. 4 is a view similar to FIG. 2 but illustrating the farther penetration of the projectile.

With a specific reference to the form of the invention illustrated in FIGS. 1 and 2 of the drawings, the numeral 1 indicates generally a plastic laminate armour plate comprising a plastic substrata layer 2 reinforced with glass fabric 2A, an extremely hard surface layer 3, and with the layers 2 and 3 being bonded together by a flexible bonding agent 4. In order to prevent spalling or flaking of the outer layer 3 upon projectile impact, a thin flexible rubberized layer or sheet 5 is preferably provided over the outer layer 3. The sheet 5 may also be of ballastic nylon cloth or felt or resin impregnated glass fabric to further prevent fragmentation of ceramic layer 3.

The first principle of the invention is that the outer layer 3 must be of an extremely hard material in order to blunt, melt or shatter the oncoming projectiles. After extensive testing, it was found that a material such as aluminum oxide or an alumina tile or alumina ceramic proved to have the lightweight characteristics desired, yet provided the extremely hard surface necessary to achieve the blunting or shattering of the projectiles upon impact. Preferably a ceramic having a high alumina content is employed, for example 75% or more, and preferably over 90%. Excellent results have been obtained with an alumina content of 94%. The alumina faced composite armor has a weight advantage of approximately 2 to 1 over aluminum armor, as well as providing better armor piercing protection. Through extensive testing, it was found that a thickness of the layer 3 between ¼ inch to ⅜ of an inch, and in the combination above described, provided adequate armor piercing protection for 30.06 armor piercing ammunition at 5 yard shooting range and 0 degree obliquity. Armor protection of this type is desired for aircraft and helicopter protection against ground troop fire. Comparing the alumina ceramic faced and plastic body reinforced armor plate of the present invention with steel shows a weight penetration advantage for the alumina ceramic over steel of about 4 to 1.

At least certain other very hard lightweight materials can be used to meet the objects of the invention. These would include silicon carbide ceramic and boron carbide ceramic, also of high density and purity. For example, HD form carbide and KT silicon carbide by the Carborundum Company of Niagara Falls, N.Y. having boron carbide contents of between about 75 to 85 percent and silicon carbide content of about 97% respectively will meet the objects of the invention. Since the boron carbide and silicon carbide are somewhat lighter in specific gravity than the alumina ceramic layers of these materials will have to be a little thicker to achieve the same projectile defeating properties. But, it has been found that the overall weight of the armor using boron carbide or silicon carbide as compared to alumina ceramic will be about the same.

It is to be particularly noted, with respect to FIG. 2, that the ceramic layer 3 tends to fracture in an expanding conical shape, indicated generally by the numeral 6, from the point of impact created by the projectile 7. The angle of conical fracture is believed to correspond to the shock wave sent ahead of the projectile. The conical expansion 6 of the impact area greatly distributes the rather small and compact impact force of the projectile 7 over a much larger area onto the substrata layer 2. Also, it was found to be advantageous to form the layer 3 in a plurality of smaller tiles indicated at 8, which tend to localize the shattering, and which sections can be easily replaced to make the armor laminate plate usable for a long service life, even after it has absorbed the impact of many projectiles. During testing it was found that if a projectile 7 impacted upon the gaps 9 between tiles 8, that the armor protection properties were just as good as if the projectile 7 hit towards the center of a tile, as indicated in FIG. 2.

The second principle of the armor laminate plate construction is based on the low thermal conductivity and high heat of ablation of plastics, plus the resilience and high impact resistance of the reinforced plastic substrata layer 2, and its force absorbing action by delaminating upon bullet impact. The layer 2 is made up of a plurality of layers of glass fabric, each layer formed of straight warp cords or filaments and undulating weft cords each of about the same strength. The layers may be laid in any random relation to each other, and in fact more than one layer can be in the same direction. The layers are saturated with a low content of resin and built up to a required thickness, for example, one-half inch. By leaving the original oils, resins, or dirt on the glass fabric caused by weaving and by using a low content of binding resin, such as 25% of resin to 75% by weight of glass fabric a structure is provided in which the layers separate from each other, or delaminate, with a force absorbing action upon being struck with a projectile. Typical binder resins are known polyester and phenolic resins.

The delaminating effect of the several layers upon projectile impact is shown in FIG. 4. The projectile 7, somewhat more shattered or flattened, has penetrated farther into the laminate. The conical plug 6 has moved against the substrata 2 to deflect it downwardly over a relatively large area. This causes delamination of the reinforcing layers in regions 14, and breakage at 15 of some of the reinforcing layers of glass fabric. The result is a high force absorbing and smothering action upon the projectile providing the protection desired.

However, results have also indicated that at least certain of the force absorbing characteristics or delaminating effects are achieved by the use of a metallic backing plate such as 12A indicated in FIG. 3B. It has been found that either aluminum or steel plate will meet these desired objects. Suitable forms would include aluminum alloys identified by alloy and temper from a group which might include 2024–0, 2024–T3, 2024–T4, 5083–0, and 5083–H113, and steel in sheet from where different combinations of cold rolling, annealing, piercing, and leveling may be used depending upon the desired tension, compression, and ultimate yield levels desired for each particular armor application. Naturally, the armor requirements for each particular use will vary, and so the properties of the metallic backing sheet must vary.

The flexible bonding agent 4 is preferably an elastomeric material which is polymerizable at room temperature and containing 100% solids when in liquid form, for example, a polysulphide or silicone rubber adhesive.

Therefore, the principles of the invention are two fold:

(1) To blunt and shatter oncoming projectiles by the hard and brittle facings of alumina ceramic, boron carbide or silicon carbide.

(2) To dissipate the kinetic energy of the projectile by low conductivity, high heat ablation, delamination, elasticity, and impact resistance in a reinforced plastic substrata layer, or a suitable steel or aluminum backing plate.

These actions are achieved both against solid steel core projectiles and against shaped charge projectiles. In the case of the steel core projectiles the core appears usually to fracture and/or melt even disappearing in part due apparently to gasifying. In the case of shaped charge projectiles the discharged gas is dissipated over and around the cone and delaminate over a large area to largely lose its effectiveness. The ablative properties of the hard facing layers and the plastic metal backing are thought to cause them to char and to set up cool gaseous boundary layers to prevent the hot gases of a shaped charge from burning through.

The embodiment of the invention illustrated in FIGS. 1, 3B, and 4 produces opaque armor plate. FIG. 3A illustrates a transparent armor plate, indicated generally by the numeral 10 and comprising an outer layer 11 secured to a substrata layer 12 by a flexible bonding layer 13. In exhaustive testing it was found that plain window glass of between ⅛ inch to ⅜ inch thickness provides a hard surface layer 11 approaching the results of the alumina ceramic tile in the already described embodiment of the invention. The substrata layer 12 is a clear plastic material, for example, stretched methyl methacrylate, having a high degree of toughness. Tests were also conducted on full tempered glass plate, ¼ inch thick, and it was found that the tempered glass, although perhaps harder than the common window glass, tended to shatter so much more than the window glass that it completely obliterated vision through the armored plate, whereas the common window glass tended to shatter only around a small portion of the periphery of the impact area.

The transparent armor plate of the invention is not as effective as the opaque and must normally be made thicker, but has the transparent feature which is sometimes a requisite.

The adhesive layer 13 must also be transparent and is usually a methyl methacrylate cement.

FIG. 3B illustrates an embodiment of the invention having a continuous hard facing layer 11A. Naturally, it is easier and cheaper to form the facing layer 11A in a continuous sheet and in at least some instances this may be the best solution. However, it should be recognized that the continuous sheet will not localize shattering as well as the separate tile-like configurations of FIGS. 1, 2, and 4.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. Armor plate including a base having a plurality of layers of resin impregnated glass fabric, the weight of the resin in the base being between 15% to 35% and the weight of the glass fabric being between 65% to 85% so that the layers of glass fabric delaminate with a force absorbing action in stopping a projectile, a continuous facing layer on the base consisting of a very hard material from the group including boron carbide ceramic, and silicon carbide ceramic, each of said materials having the characteristic of shattering and deforming a projectile striking it and of forming a conical plug of increasing diameter in the direction of projectile penetration to distribute the force of the projectile over a greater area of the base, and a layer of flexible adhesive securing the facing layer to the base.

2. Armor plate according to claim 1 wherein the group of very hard materials the boron carbide ceramic has a boron carbide content of over 85%, and the silicon carbide ceramic has a silicon carbide content of over 95%.

3. Armor plate according to claim 1 where the facing layer is broken into a plurality of separate tiles in very close spaced relation to localize shattering caused by the impact of a projectile.

4. Armor plate including a base made from a metallic plate having great resilient qualities, tensile strength and stretchability to withstand the impact of a projectile with a force absorbing action, a continuous facing layer on the base consisting of a very hard material from the group including alumina ceramic, boron carbide ceramic, and silicon carbide ceramic, each of said materials having the characteristic of shattering and deforming a projectile striking it and of forming a conical plug of increasing diameter in the direction of projectile penetration to distribute the force of the projectile over a greater area of the base, and a layer of flexible adhesive securing the facing layer to the base.

5. Armor plate according to claim 4 wherein the group of very hard materials the alumina ceramic has an alumina content of over 75%, the boron carbide ceramic has a boron carbide content of over 85%, and the silicon carbide ceramic has a silicon carbide content of over 95%.

References Cited

UNITED STATES PATENTS

| | | | |
|---|---|---|---|
| 2,234,829 | 3/1911 | Neher et al. | 161—204 |
| 2,733,177 | 1/1956 | Meyer | 161—404 |
| 2,778,761 | 1/1957 | Frieder et al. | 161—404 |
| 2,861,021 | 11/1958 | Dietz et al. | 161—404 |
| 2,991,209 | 7/1961 | Warrall | 161—404 |

CARL D. QUARFORTH, Primary Examiner

H. E. BEHREND, Assistant Examiner

U.S. Cl. X.R.

161—36, 204

Disclaimer and Dedication 3,516,898.—*Richard L. Cook*, Phoenix, Ariz. HARD FACED PLASTIC ARMOR. Patent dated June 23, 1970. Disclaimer and Dedication filed Oct. 14, 1983, by the assignee, *Goodyear Aerospace Corp.*

Hereby disclaims and dedicates to the Public the term of this patent subsequent to Aug. 8, 1983.

[*Official Gazette December 20, 1983.*]